FORCED CLOSURE DIPOLAR ELECTRO-OPTIC SHUTTER AND METHOD

Original Filed June 8, 1966 5 Sheets-Sheet 1

FORCED CLOSURE DIPOLAR ELECTRO-OPTIC SHUTTER AND METHOD

Original Filed June 8, 1966 5 Sheets-Sheet 2

FORCED CLOSURE DIPOLAR ELECTRO-OPTIC SHUTTER AND METHOD

Original Filed June 8, 1966 5 Sheets-Sheet 3

FORCED CLOSURE DIPOLAR ELECTRO-OPTIC SHUTTER AND METHOD

Original Filed June 8, 1966 5 Sheets-Sheet 4

FORCED CLOSURE DIPOLAR ELECTRO-OPTIC SHUTTER AND METHOD

Original Filed June 8, 1966 5 Sheets-Sheet 5

F

United States Patent Office

Re. 28,211
Reissued Oct. 22, 1974

28,211

FORCED CLOSURE DIPOLAR ELECTRO-OPTIC SHUTTER AND METHOD

Alvin M. Marks, 153—16 10th Ave.,
Whitestone, N.Y. 11357

Original No. 3,527,525, dated Sept. 8, 1970, Ser. No. 556,113, June 8, 1966. Application for reissue Sept. 5, 1972, Ser. No. 286,041
Int. Cl. G02f *1/34*
U.S. Cl. 350—267 17 Claims

Matter enclosed in heavy brackets [ ] appears in the original patent but forms no part of this reissue specification; matter printed in italics indicates the additions made by reissue.

ABSTRACT OF THE DISCLOSURE

Electro-optical devices are disclosed which employ a layer of minute dipolar particles in a suspension carried between two transparent sheets. A series of spaced wire-like electrodes are carried by the transparent sheets on each side of the dipolar layer. Electrical circuits including switching means and a source of electrical alternations are connected to the electrodes to set up and control electric field patterns within the dipole suspension to positively randomize or orient the dipoles.

This invention relates to electro-optical devices employing a suspension of dipolar rod-like particles oriented for light transmission reflection or absorption purposes by an electric field and more particularly to means for increasing the speed of particle response. The electro-optical devices of the present invention are known as VARAD panels. Such devices comprise insulated transparent electrodes containing therebetween a layer of a fluid suspension of dipolar rod-like particles, for example, metal rods or herapathite crystals. The dipolar rod-like particles generally have a length of about 2000 A. and a width of about 100 A. and are capable of reacting with visible light or other electro-magnetic radiation [.] (1 A.$=10^{-10}$ m.).

Normally with no potential difference applied between the transparent electrodes, the dipolar rods are oriented at random due to the impacts of the fluid molecules, known as Brownian motion. Light incident upon the panel is absorbed and the panel is almost opaque (closed).

When an alternating potential difference is applied between the transparent electrodes, the dipolar rods orient normal to the panel and the light transmittance increases; that is, the optical density decreases to a minimum, exponentially. The opening or "alignment time" is defined as the time for the dipole suspension layer to reach 1/e or 37% of the minimum optical density. If the AC potential difference is suddenly cut off, the dipoles disorient to random directions by Brownian motion and the optical density increases exponentially. The closing (disorienting) or "relaxation time" is defined as the time for the dipole suspension layer to attain 1/e or 37% of the maximum optical density. The relaxation time of a dipole suspension is linear with viscosity, and inversely proportional to the cube of the dipole length.

The Z axis is defined as the normal to the major plane of the VARAD panel, and the X and Y axes are rectangular in the said plane.

As an example, using a Herapathite dipole of dimensions about 5000 x 200 x 50 A. in a suspension layer 0.75 mm. thick, in a fluid of about 20 millipoise viscosity and with a potential difference of 500 volts RMS at a frequency of 100 kc. applied parallel to the Z axis, between transparent insulated electrodes 1 mm. apart, the dipolar rods substantially orient parallel to the Z axis. In this example, the VARAD panel "opens" in less than 100 microseconds, but more than about 1000 microseconds is required to "close" or randomize the dipoles by Brownian motion alone. The present invention is intended to decrease the "closing time" such that it is equal to, or less than the "opening time [."] ".

The minimum possible relaxation time of an optimum dipole suspension due to Brownian motion only may be computed using the data from the above example, and the known physical laws relating relaxation time, dipole length and fluid viscosity.

(1) The optimum dipole dimension for visible light of 5600 A. mean wavelength is about $\lambda/3$ or about 1880 A. The dipole dimensions of the above example thus may be advantageously decreased by a factor of $$5000/1880=2.66,$$

whereby the relaxation time is decreased by a factor of $(2.66)^3=19$ times.

(2) The smallest viscosity fluid available is about 2 millipoise. Thus, the fluid viscosity of the above example may be decreased by a factor of 10.

(3) From (1) and (2) therefore, the fastest relaxation time attainable by Brownian motion, with an optimum dipole suspension, appears to be less than that measured in the above example by a factor of about $19\times10$ or 190 times; that is, about 5 microseconds.

With such an optimum dipole suspension, the forced closure principles herein disclosed would nevertheless enable a further decrease in the relaxation time to about $10^{-7}$ sec. or 100 nanoseconds. Thus, whatever the improvement in Brownian motion closure time may be achieved by a decrease of dipole dimensions and fluid viscosity, a still further substantial improvement in relaxation time by a factor of 20 or more is achievable by a forced closure process according to the present invention.

For many purposes, as for protection from flash blindness, the closure time must be 100 microseconds or less. Such speed is accomplished by the present invention, as hereinafter described.

The invention comprises electrode structures and associated circuits designed to permit the Z-X switching. During the Z-X switching, the electric field may be shifted and interlaced to provide a uniform positive disorientation of the dipoles, hereinafter referred to as "force disorientation [.]".

Critical multi-electrode conducting line dimensions have been determined so that electrode structures are invisible to the eye, and absorb only about 2 to 8% of the light passing therethrough, with little or no deterioration of the image caused by the diffraction effect.

It is an object of this invention to provide a dipole shutter having a rapid closure time suitable for use as a photographic shutter, or as a panel for the protection against light flashes, nuclear or otherwise.

It is an object of this invention to rapidly disorient or realign an initially aligned dipole suspension.

It is an object of this invention to use an electrical field to force disorient a previously aligned dipole suspension.

It is an object of this invention to provide an electrode structure and associated circuits suitable for aligning a dipole suspension placed between said electrode structure in the Z direction and to force disorient and/or realign said dipoles in the X and/or Y directions.

It is an object of this invention to rapidly decrease the transmittance of a previously aligned single layer dipole suspension by realigning a portion of the dipoles on one surface of the layer in the X direction and realigning another portion of the dipoles on the other surface of the layer in the Y direction.

It is an object of this invention to provide a transparent invisible electrode structure on a transparent sheet comprising conducting lines, alternate pairs of which may be excited independently and in which all terminals are brought out on one of the sheets.

It is an object of this invention to utilize conducting line multi-electrodes on a transparent sheet in which the electric fields are shifted and interlaced to uniformly and rapidly opaque the sheet.

It is an object of this invention to provide isolation circuits so as to avoid cross talk between pairs of alternate electrodes.

It is another object of this invention to use the rotational inertia of the dipoles produced by a pulse comprising an alternating potential difference of large amplitude, within a gate of short time duration, applied to a dipole suspension whereby the dipoles continue to rotate for some time after the electrical pulse is applied.

It is an object of this invention to provide an optimum dipole suspension having a minimum relaxation time due to Brownian motion alone.

This invention utilizes novel electrode structures and circuits which enable the application of alternating electric fields in the Z direction, and subsequently in the X and/or Y direction.

A uniform opaquing of the visual field is produced by a shift and interlacing of the field pattern in the X and/or Y directions between interlaced conducting line pairs.

The shifting and interlacing of the electric field in the X and/or Y direction is necessary to produce a uniform opaquing of the visual field. If the electric field pattern remains stationary it has been found that strips of alignment and disalignment result in a visual field having alternate transparent and opaque strips.

The shift and interlacing of the electric field may be produced by a translation of the electric field in the X and/or Y direction by:

(a) A succession of two gated AC pulses having one or more alternations.

(b) Two phase AC voltages.

(c) A rotating electric vector produced by a 90° phase displacement. Any suitable rotation, for example 90° may suffice to cause disorientation.

Starting with a dipole suspension initially aligned in the Z direction, a rapid decrease in the transmittance of the panel from an initial high transmittance is forced by one or more of the following processes:

(1) One or more pulses of an alternating potential difference applied with field shifting in the X direction between parallel line conductors. The time duration of these pulses is adjusted to be just sufficient to cause randomization but not reorientation of the dipoles.

(2) One or more pulses of an alternating potential difference applied with field shifting to each side successively to a single layer dipole suspension, adjacent one surface of the layer in the X direction and adjacent the other surface in the Y direction, to obtain dipoles aligned at 90° to each other, result in opaquing by cross polarization. Opaquing a pair of dipole layers by crossed polarization was previously described in U.S. Pat. 3,167,607, in which each dipole layer had a single pair of electrodes. The present invention utilizes special multi-electrode structures and a single dipole layer. One or more pulses are applied in the X direction of a time duration just sufficient to produce X orientation; then by one or more pulses applied in the Y direction of a time duration just sufficient to cause Y orientation. The conducting line structures on each side of the dipole layer are at right angles, one set of conducting lines being along the X direction, the other set of conducting lines being along the Y direction.

(3) An inertial dipole effect. The invention consists of the construction, combination and arrangement of parts as herein illustrated, described and claimed.

In the accompanying drawings forming a part hereof, there is illustrated several forms of embodiment of the invention in which drawings similar reference characters designate corresponding parts, and in which:

FIG. 1 shows a VARAD panel utilizing thin electrodes embedded in the laminated sheets with the dipoles omitted for the sake of clarity. The electrodes are shown applying an electrical field in dashed lines in the Z direction to align the dipoles parallel to the Z axis for maximum transmittance.

FIG. 2 shows the same VARAD panel shown in FIG. 1 but with the electric field pattern applied momentarily in the X direction to produce forced disorientation. All regions are disoriented equally by shifting and interlacing the electric field pattern in the X direction periodically FIG. 3 shows for a VARAD panel having electrodes as in FIG. 1, the alternating potential difference $V_z$ for Z alignment of the dipoles and the successive gated alternating potential differences $V_{x1}$ and $V_{x2}$, applied successively to shift and interlace the electric field structure in the X direction, to provide a uniform disorientation of the dipoles.

Figure 1:
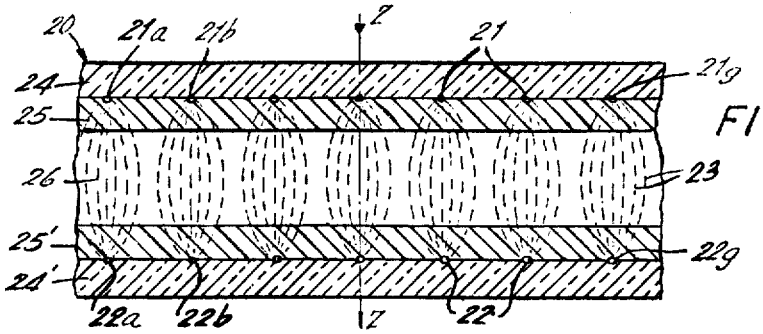
Figure 2:
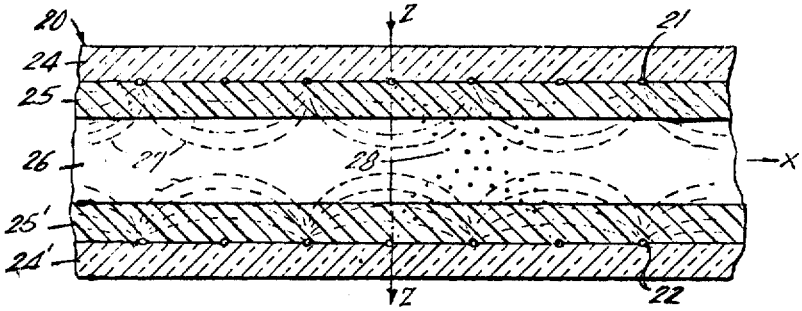
Figure 4:
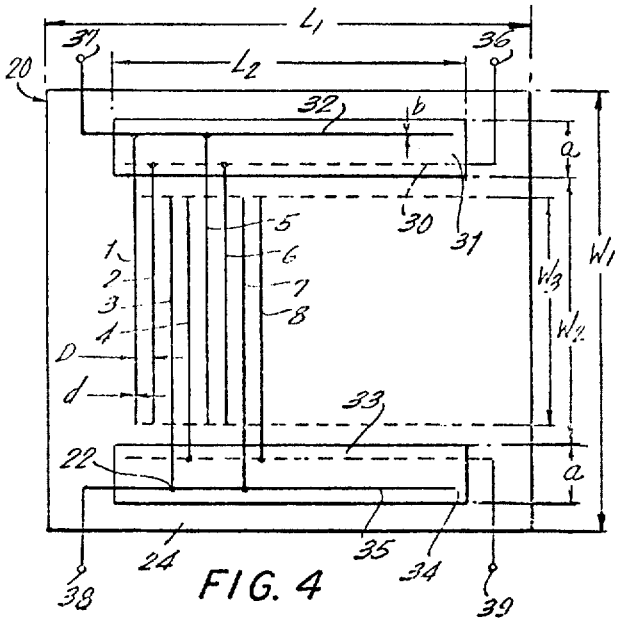
FIG. 4 shows a plan view of a conducting line electrode structure deposited on a transparent supporting plate.

Referring now to FIGS. 1, 2 and 4; 20 indicates a VARAD panel adapted for forced disalignment having multielectrodes 21, 22 for Z-X electric field switching. In carrying out the Z-X electric field switching shown in FIGS. 1 and 2, the circuits hereinafter described are used.

FIG. 1 shows AC electric field lines 23, applied parallel to the Z direction between the multielectrodes 21a, 21b, 21c, 21d, 21e laminated between transparent sheets 24 and 25, and the corresponding multielectrodes 22*a*, 22*b*, 22c, 22d . . . 22g laminated between transparent sheets 24′ and 25′. An AC electric field applied parallel to the Z axis, between the conductors 21g and 22g aligns the dipoles (not shown) with their long axes normal to the transparent sheets 24, 25, 24′, 25′ resulting in maximum transmittance.

FIG. 2 shows the same panel shown in FIG. 1, in which the X electric field is shifted alternately between multi-electrodes 21a, 21c, 21e, 21g; 22a, 22c, 22e, 22g and 21b, 21d, 21f; 22b, 22d, 22f. An electric field pattern in the X direction is thus shifted from position 27 (dashed lines) to position 28 (dotted lines) and vice versa. The space 29 between the fields which has a zero electric field when the electric field patterns 27 are established, is replaced by the shifted electric field pattern 28 shown in dotted lines. Thereby the entire dipole layer 26 (dipoles in the suspension between the sheets 25, 25′) is uniformly disoriented.

Figure 3:
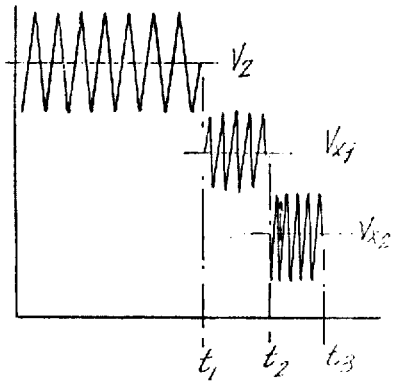

FIG. 3 shows actuating alternating potential differences as applied to a VARAD panel, for maximum transmittance, followed by a rapid forced opaquing. For maximum transmittance, the alternating potential difference $V_z$ is applied to produce an electric field pattern as at 23 in FIG. 1. To produce the rapid opaquing the gated alternating potential differences $V_{x1}$ and $V_{x2}$ are applied to produce the shifting and interlaced electric field patterns as shown at 27, 28 in FIG. 2. The pulses $V_{x1}$ and $V_{x2}$ are applied at times $t_1$ and $t_2$ respectively with pulse durations $\Delta t = t_2 - t_1$ sufficient to disorient the dipoles, but not of a longer duration which would reorient them in the X direction.

The forced closure process shown in FIGS. 1 and 2 may be performed with a VARAD panel having the conducting line electrode structure shown in FIG. 4 between the transparent supporting plates 24, 25; 24′ and 25′.

With the conducting line electrode structure of FIG. 4 all connections are on one side of one plate. A glass plate 24 is prepared with conductive lines of thickness d, ruled a distance D apart. The conducting lines are connected as follows: Lines 2, 6, 10, etc. are brought out through busbar 30 and terminal 36. An insulating strip 31 of width a and length $L_2$ is then deposited over the busbar 30 to terminal 36. The lines 1, 5, 9 etc. are then deposited over the insulating strip 31 and continue onto the surface of the glass plate 24. Lines 1, 5, 9 are connected to busbar 32 and terminal 37. In a similar manner the lines 4, 8, 12 are brought out to busbar 33 and terminal 39. An insulating strip 34 is deposited thereover. Lines 3, 7, 11 are then deposited over the strip 34 and onto the surface of the glass plate 24 and connected to busbar 35, and terminal 38. Over all the conducting lines a transparent insulating coating is deposited; for example, a vapor deposited coating such as silicon monoxide, or sputtered glass. As an example, suitable dimensions for the plate shown in FIG. 4 are:

TABLE I

| Conducting line: | Plate dimensions (mm.) |
|---|---|
| D | 1 |
| d | 0.01–0.001 |
| $W_1$ | 75 |
| $W_2$ | 55 |
| $W_3$ | 50 |
| $L_1$ | 75 |
| $L_2$ | 50 |
| a | 6 |
| b | 1 |
| t | 2 |
| $t_1$ | 0.001–0.010 |
| $t_2$ | 0.001–0.010 |

For the conductive lines to be invisible at 45 cm. from the eyes requires at least 4 lines per mm. The transmittance of the panel depends on the proportion of the area taken up by the lines as compared to the space between the lines.

The characteristics of VARAD panels with conductive lines spaced so as to be invisible is given in the following Table II:

TABLE II

| Lines per mm | 4 | 8 |
|---|---|---|
| Width of conductive lines, mm | 0.005 | 0.005 |
| Distance between lines, mm | 0.250 | 0.125 |
| Ratio=(0.250/0.005) | 50 | 25 |
| Absorption per panel, percent | 2 | 4 |
| Absorption per VARAD panel, percent | 4 | 8 |
| Dipole layer thickness, mm | 0.250 | 0.125 |

Figure 5:
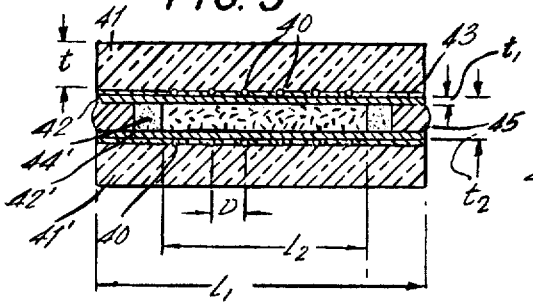
FIG. 5 shows a VARAD cell assembly utilizing the electrode structures shown in FIG. 1.

FIG. 5 shows another embodiment of an assembled dipole cell. Wires 40 are stretched parallel and equally spaced. The wires are embedded and laminated between a 0.15 mm. glass plate 41 and a 1 mm. glass plate 42 using a suitable transparent cement 43 such as an epoxy cement. Two such laminations are employed. A 0.7 mm. spacer 44 provides space for the dipole layer. The assembly is joined around the edges with the epoxy cement 43. Each wire is brought out to a terminal (not shown).

To apply the electric field in the X direction, as in FIG. 2, the alternating potential difference is applied between every other wire on one lamination and the corresponding wires on the opposed lamination. The insulating transparent glass layers 42 and 42′ have a dielectric constant of about 5. The dipole suspension layer may have a dielectric constant of about 2. This may result in shorting a proportion of the electric flux within the glass. The torque on the dipoles is greater in a fluid medium having a small dielectric constant. It is important, of course, to keep the turning force on the dipoles at a maximum with a given applied electric potential difference. It is not advisable, therefore, to increase the dielectric constant of the fluid dipole suspension.

To maximize the proportion of electric flux passing through the dipole layer in the X direction, the thickness of the insulating transparent layers 42, 42′ must be minimized. A transparent insulating coating a few microns thick, as described in connection with FIG. 4, will short a smaller proportion of the total electric flux in the X direction. In any case, however, a substantial proportion of the flux will, of course, pass through the transparent supports 41 and 41′.

Figure 6:
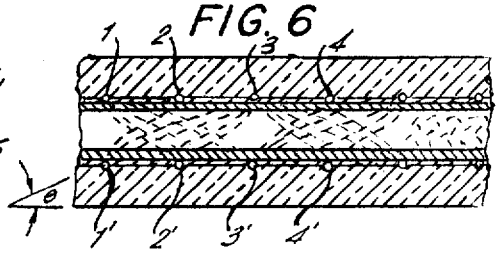
FIG. 6 shows a portion of a VARAD cell having another electric field configuration in which the forced disorientation or realigning electric field is applied between electrodes on opposite sides of the dipole suspension.

Another way of avoiding the loss of flux in the X direction by shorting through the glass layers 41 and 41′, is shown in FIG. 6 in which the electric fields are applied across the dipole suspension layer 26 between 1–3′; or 2′–4′ for alternating potential differences 90° out of phase, the electric field being shifted as shown in FIG. 2. With this arrangement all the electric flux passes through the dipole suspension and causes a maximum torque on the dipoles.

Figure 7:
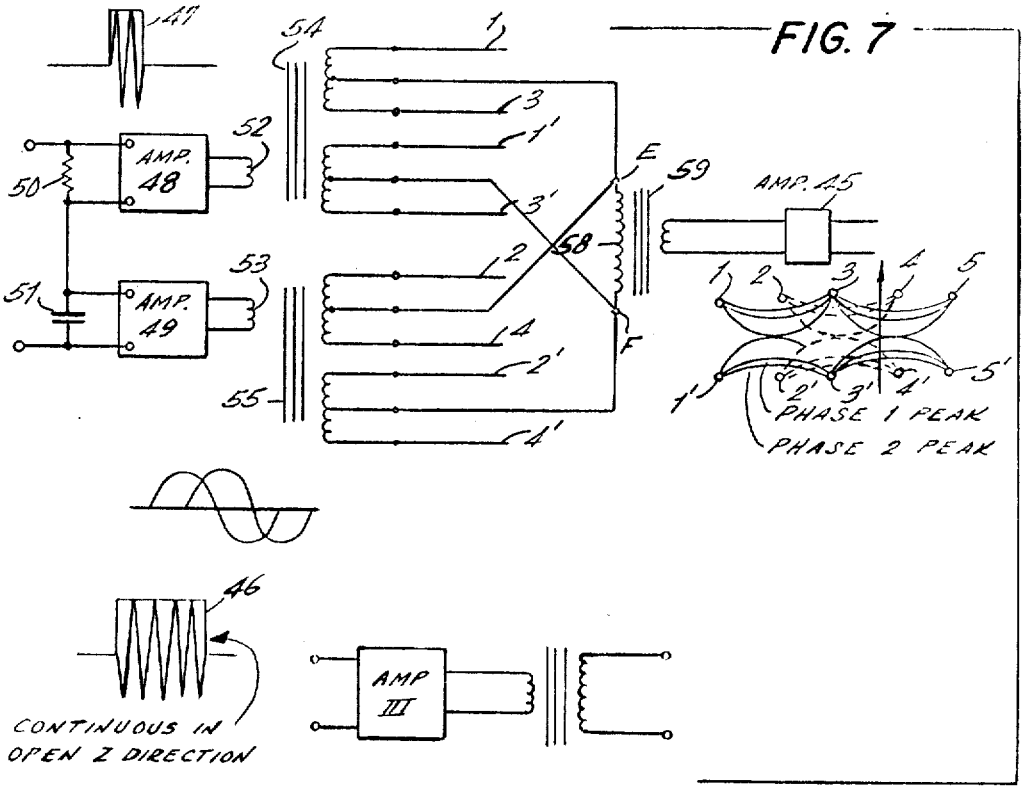
FIG. 7 shows a circuit for Z-X switching, employing a two-phase center tapped transformer.

FIG. 7 shows a ZX switching transformer coupled circuit connected to the conducting line electrodes for forced randomization by eelctric field shifting and interlacing. This circuit operates as follows:

To make the dipole suspension transparent, amplifier 45 is fed an alternating potential difference 46 from an oscillator (not shown) whereupon an amplified potential difference appears across the dipole suspension in the Z direction. All the conducting lines 1, 2, 3 and 4 on the upper plate are of the same potential. In similar manner, all the conducting lines 1′, 2′, 3′, 4′ etc. of the lower plate are at another potential. When the alternating potential difference 46 is shut off, an alternating potential difference 47 is immediately applied to amplifiers 48 and 49. The amplifiers 48 and 49 are actuated by an oscillator (not shown), supplied to resistor 50 and condenser 51 in series. This results in alternating potential differences 90° out of phase fed to amplifiers 48 and 49 respectively. The amplifiers 48 and 49 supply voltage 90° out of phase to the primary coils 52 and 53 of the transformers 54 and 55. Interlaced potential differences appear across the conductive lines in the X direction. The field pattern then shifts back and forth as shown in FIG. 2 each 90° in the cycle. The pulse 47 is applied just long enough to force-randomize the dipole suspension and make it opaque more rapidly than by Brownian motion alone.

Figure 8:
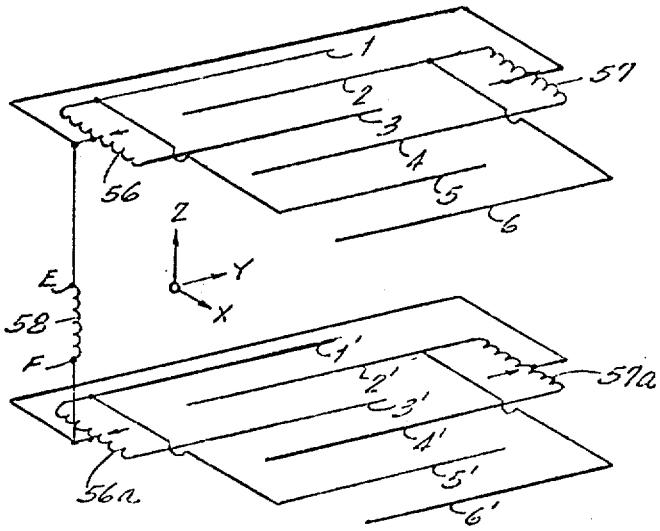
FIG. 8 is an isometric view of a detail of the circuit shown in FIG. 7 illustrating interconnections of the multi-electrode structures on the VARAD panel for Z, X excitation.

FIG. 8 shows a detail of FIG. 7. It is an isometric view of the conducting line electrode structure connected for Z-X switching with field shifting and interlacing in the X direction. The lines 1, 2, 3, 4 etc. are on the upper plate and the corresponding lines 1', 2', 3', 4' etc. are on the lower plate, connected to the secondary coils 56, 56a, 57, 57a of the transformers 54, 55. Coils 56 and 56a are activated together, and then coils 57 and 57a are activated together, alternately. The center taps of coils 56, 57 are connected together and to terminal E of secondary coil 58 of transformer 59 (see FIG. 7). The coils 56a and 57a are connected together and to the other terminal F of secondary coil 58 of transformer 59. Hence, when there is no potential applied to the coils 56, 57, 56a, 57a, by the transformer primary coils 52 and 53, the potential of the lines on the upper plate and the potential of the lines on the lower plate, are determined only by the potential across secondary coil 58 of transformer 59, which is actuated by the amplifier 45.

A difficulty with this circuit is that the disorientation and/or realignment is not uniform because the electric field lines proceed not only between lines 1 and 3, but some electric field lines loop from lines 1 to 2 to 3, thus preventing effective field shifting. Lack of uniformity may be seen by viewing the panel against a white background through a light polarizer. The region near the wires appears brighter, and the region between the wires darker. This difficulty is overcome by using the isolation circuits shown in FIGS. 11, 12 and 13 and hereinafter more fully described.

Figure 9:
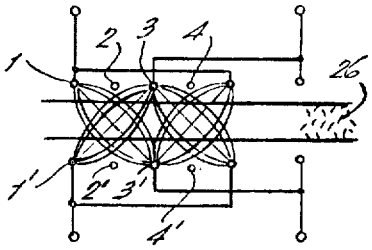
FIG. 9 shows an electric field configuration for producing a resolved electric field vector in the X direction.
Figure 10:
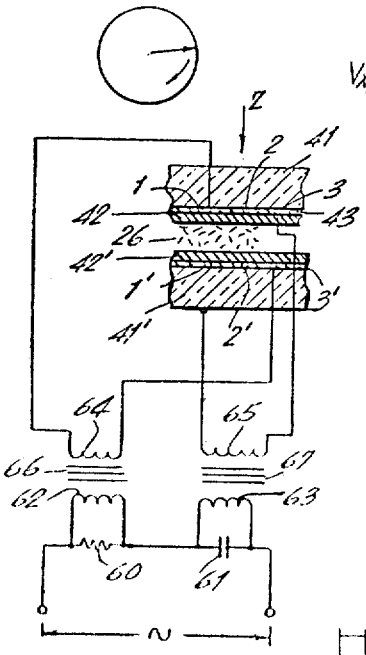
FIG. 10 shows a circuit and electrode structure for producing a rotating electric field vector Z-X forced disorientation.

In FIGS. 9 and 10, a rotating field is momentarily produced and then shifted and interlaced along a dipole layer, uniformly disorienting or realigning the dipoles. All the electric field lines pass through the dipole suspension layer 26. The shifting and interlacing of the electric field is accomplished by switching the alternating potential differences, as 90° displaced phases I and II back and forth; first between lines 1–3' and 1'–3; and second between 2'–4' and 2'–4, respectively.

FIG. 10 shows a circuit for providing a rotating electric field vector within the dipole suspension to disorient or realign the dipoles. This rotation is accomplished by supplying the line conductors with alternating potential differences 90° out of phase. The circuit comprises the resistance 60 and capacitance 61 across the primary coils 62 and 63 respectively. The secondaries 64 and 65 of the transformers 66 and 67 supply voltages 90° out of phase to the line conductors 1–3' and 1'–3 respectively. A rotating electric field vector thus appears in the dipole layer 26. A rotation of only about 45° is usually sufficient to randomize the dipoles.

Figure 11:
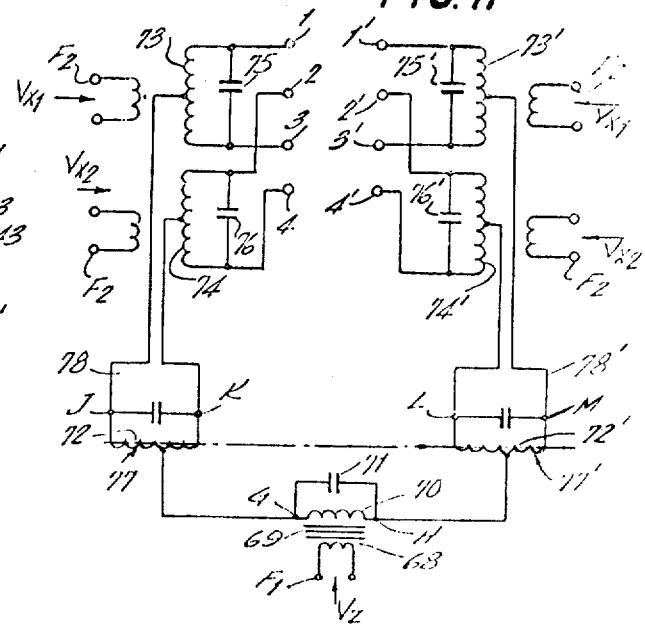
FIG. 11 shows a circuit, elements of which are resonant at one frequency for orienting the dipole in the Z direction and other elements resonant at a second frequency for force disorienting or realigning the dipoles.
Figure 12:
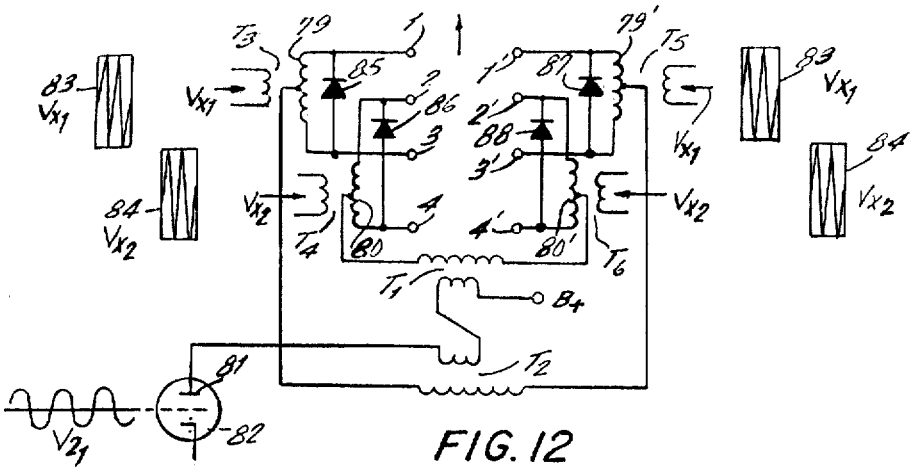
FIG. 12 shows a transformer coupled isolation circuit for Z-X alignment.
Figure 13:
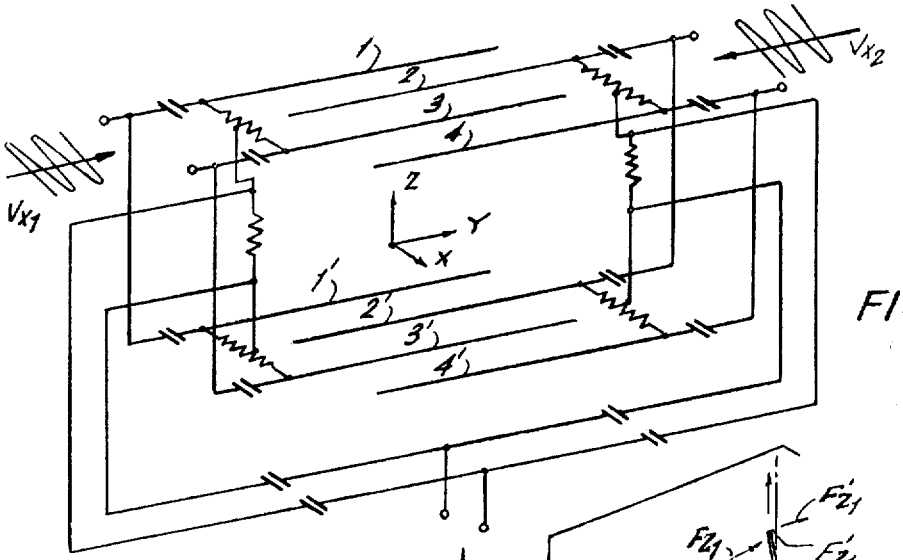
FIG. 13 shows capacitatively coupled isolation circuit for Z-X alignment.

FIGS. 11, 12 and 13 show circuits for Z-X switching and for electrically isolating pairs of conducting line electrodes. Gated alternating potential differences for Z-X switching are shown and described in connection with FIG. 3. To make the dipole layer suspension transparent, the alternating potential difference $V_z$ is supplied in the Z direction. To make the dipole suspension layer opaque rapidly and uniformly, gated alternating potential differences $V_{z1}$ and $V_{x2}$ are applied in the X direction, as previously described.

The circuit shown in FIG. 11 is transformer coupled and electrically isolated by tuned circuits. The circuit shown in FIG. 12 is transformer coupled and electrically isolated by separate transformer secondaries. The circuit shown in FIG. 13 is actuated and electrically isolated by capacitative coupling.

In FIG. 11 the Z aligning voltage is applied at frequency $F_1$ through a primary coil 68 of transformer 69 and appears across the secondary coil 70. The coil 70 and circuit comprising the condenser 71 is made resonant at frequency $F_1$. Coils 72 and 72' are center tapped. The terminal G of coil 70 is connected to the center tap of coil 72. Terminals J and K of coil 72 are connected to the center taps of coils 73 and 74. The terminal H of coil 70 is connected to the center tap of coil 72'. The terminals L and M of coil 72' are connected to the centertaps of the secondary coils 73' and 74'. An alternating potential difference of frequency $F_1$ from the terminals GH is applied between the conducting lines 1, 2, 3, 4 of the upper plate and conducting lines 1', 2', 3', 4' of the lower plate. The secondary coils 73, 74, 73' and 74' are respectively made a part of the tank circuits. The coil and condenser combinations are as follows:

73–75, 74–76, 73'–75', 74'–76'.

These four tank circuits are all resonant at a frequency $F_2$. Frequency $F_2$ is greater than frequency $F_1$. The two tank circuits 77–78 and 77'–78' are resonant at frequency $F_1$. As a consequence, the pairs of terminals 1–3 are electrically isolated from the pairs of terminals 2–4. In a similar manner pairs of terminals 1'–3' are electrically isolated from the terminals 2'–4'. The frequency $F_1$ is applied for the time during which the VARAD panel is to remain transparent. The frequency $F_2$ is applied in the X direction using gates $V_{x1}$ and $V_{x2}$ as shown in FIG. 3. These gates are applied in succession and thus produce a field shifting and interlacing, causing a uniform disorientation or realignment of the dipoles.

The center taps of coils 73 and 74 are connected through an electrical filter network 77–78 adapted to block the resonant frequency $F_2$. The alternating potential differences across coils 73 and 74 appear across the terminals 1–3 and 2–4 respectively, and each independently varies while the center terminal is "floating"; that is, its potentials across 1–3 do not affect the potentials of the adjacent line conductors 2–4, because they are effectively disconnected therefrom by the blocking filter network 77–78. The blocking filter coil 77 and the condenser 78 are tuned to a lesser frequency $F_1$. For example, the coil 77 and condenser 78 may be tuned to 10 kc., while coil-condenser 73–75 and 74–76 may be tuned to a greater frequency, for example 100 kc.

The Z-X isolation circuit of FIG. 12 is another circuit designed for forced closure.

Utilizing the interlaced field structures shown in FIG. 2, the secondary coils 79 and 79' are connected to the terminals of electrodes 1 and 3 and 1' and 3'; and the secondary coils 80 and 80' are connected to the terminals of electrodes 2 and 4 and 2' and 4'. Complete isolation between the electrode conductors 1–3 and 2–4 is accomplished because there is no interconnection between the secondaries of transformers $T_3$ and $T_5$ and the secondaries of transformers $T_4$ and $T_6$. Coupling is obtained electromagnetically through the transformers $T_1$ and $T_2$ and not by a physical connection.

The advantage of this is that any potential applied to electrodes 1 and 3 and 1' and 3' will not be transmitted to the electrodes 2 and 4 or 2' and 4'. Thus the alternate electrodes are "floating" when a potential is applied to the adjacent electrodes. The result is that most of the field lines curve past the alternate electrodes and do not terminate into them. A longer and more parallel path for the electric field lines is achieved in the X direction. The electric field pattern can now shift and interlace between alternate electrodes, which does not occur when the field lines proceed from one conducting line electrode to the next adjacent.

The center taps of the secondaries of transformers $T_3$ and $T_5$ are connected together through secondaries of the transformer $T_2$. In a similar way, the center taps of the secondaries of $T_4$ and $T_6$ are connected through the secondary of the transformer $T_1$. The primaries of transformers $T_1$ and $T_2$ are connected in series to the plate 81 of tube 82. To align the dipoles and make the VARAD panel transparent, the alternating potential difference $V_{z1}$ is applied between the grid of the tube 82, and ground;

thus, inducing opposite polarities on all the terminals of electrodes 1, 2, 3, 4 . . . relative to the terminals of electrodes 1', 2', 3', 4'. . . .

When the VARAD panel is to be force-closed, the disorienting gate 83 is applied to the primaries of transformers $T_3$ and $T_5$. The disorienting gate 84 is immediately thereafter applied to the primaries of transformers $T_4$ and $T_6$. The first gate 83 is applied across terminals of electrodes 1–3 and 1'–3' in the same X direction. Gate 84 is subsequently applied across the terminals of electrodes 2–4 and 2'–4' in the X direction.

The diodes 85, 86, 87 and 88 are provided so that if required, only a single uni-directional pulse may be applied across the terminals in the X direction. In this case the pulse 83 decreases to zero before pulse 84 builds up to a maximum. Thus, there is no interference between the fields. The time duration between the pulses may be varied. The number of pulses may be controlled by fitting a frequency $F_2$ into the gates 83 and 84.

Figure 14:
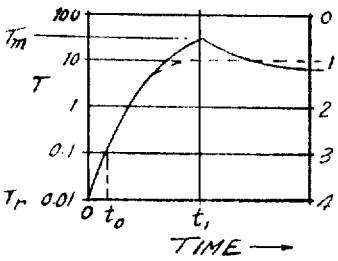
FIG. 14 is a graph showing the inertial alignment effect for an herapathite dipole suspension by a short gated alternating potential difference $V_z$, applied along the Z axis; compared to the slow disorientation of Brownian motion alone.

FIG. 14 illustrates the inertial dipole effect, showing transmittance and optical density versus time for a dipole suspension, to which has been applied an alternating potential difference of frequency F within a gate having the time duration $t_0$. The alignment continues after the pulse reaches peak at time $t_1$. The transmittance increases from the minimum random $T_r$ to maximum $T_m$ at time $t_1$; then decreases more slowly by Brownian motion.

Figure 15:
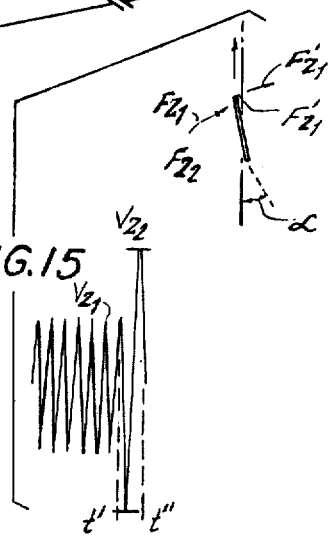
FIG. 15 is a force diagram of an alternating electric potential difference $V_{z1}$ for Z alignment followed by a pulse $V_{z2}$ of increased amplitude respectively, to cause Z alignment followed by forced disorientation due to the inertia effect.

FIG. 15 illustrates an inertial process for forced randomization of dipoles. In the figure $V_{z1}$ represents an alternating potential difference along the Z axis between transparent electrodes, which may be of the conducting line type heretofore described. The alternating potential difference $V_{z1}$ is not quite sufficient to fully align the dipoles parallel to the Z axis. The force acting on the dipole $F_{z1}$ due to the applied electric field $V_{z1}$ is just sufficient to maintain the dipole at an angle $\alpha$ to the Z axis. A resolved force normal to the length of the dipole of $F'_{z1}$ results in an aligning torque balancing the disorienting torque due to Brownian motion.

Just prior to cutoff at time t', the alternating potential difference is suddenly increased to $V_{z2}$ for one or more cycles and is thereafter cut off at time t''. This causes the force vector on the dipole to be suddenly increased to $F_{z2}$, and the resultant force vector normal to the dipole to $F'_{z2}$. This is equivalent to striking the dipole with a blow giving it rotational energy. The dipole then accelerates and inertially continues to rotate past the Z axis until it reaches a random direction. The advantage of the inertial randomizing method is its simplicity. The voltages are applied only in the Z direction and a simple transparent electrode structure is then possible. A disadvantage of the inertial method is that the dipoles must be maintained at less than maximum transparency to produce a resolved force vector $F'_{z2}$ capable of supplying the dipoles with enough rotational energy for rapid force randomization.

Table III shows experimental results on the inertial alignment effect for an herapathite dipole suspension. In this experiment a gate of the time duration $t_0$ containing an alternating potential difference of frequency of 100 kc. of about 500 volts rms is applied in the Z direction across a VARAD cell. This VARAD cell was constructed as shown in FIG. 5. The observations show that the inertial dipole effect exists.

TABLE III.—INERTIAL DIPOLE EFFECT

[Time in microseconds]

| Test number | 1 | 2 | 3 | 4 | 5 |
|---|---|---|---|---|---|
| Pulse duration $t$ | 50 | 100 | 200 | 500 | 1,000 |
| Time to attain a maximum transmittance | 1,000 | 1,000 | 1,100 | 1,200 | 1,300 |
| Time for which alignment continues after the applied pulse | 950 | 900 | 900 | 700 | 300 |
| Random transmittance at start of pulse, percent | 0.15 | 0.18 | 0.18 | 0.18 | 0.18 |
| Transmittance at end of pulse, percent | 0.16 | 0.19 | 0.4 | 0.3 | 0.11 |
| Maximum transmittance, percent | 1.2 | 4.0 | 7.0 | 10.0 | 15.0 |

Figure 16:
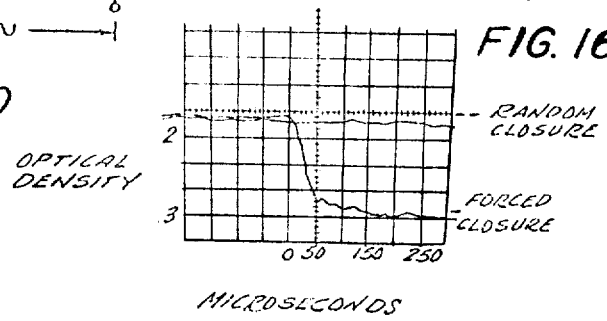
FIG. 16 shows for an herapathite suspension, experimental comparison of the speeds random closure vs. forced closure showing optical density vs. time traces displayed on the storage scope.

In FIG. 16 there is shown for an herapathite suspension, the experimental trace on a storage scope of optical density vs. time as shown for random closure and forced closure. The sweep time is 100 microseconds per division. Random closure by Brownian motion only was approximately 0.2 of an optical density unit per millisecond, or approximately 5000 microseconds per density unit. This is an increase in speed by a factor of 100 times.

A dipole suspension having a smaller viscosity shorter dipoles, and subjected to a greater electric field intensity would show faster alignment or disalignment times.

As an example, for Herapathite dipoles having approximately dimensions 0.50 x 0.002 x 0.001$\mu$ in a fluid having a viscosity of 20 millipoise, disalign within 50 microseconds, using an alternating electric field with fewer than 5 cycles of a frequency of 100 kc. in the X direction.

For a given alternating potential difference in the Z direction, greater frequencies result in faster and more complete alignment; that is, greater transmittance values. However, the power requirements of the supply circuit increases as the square of the frequency. Hence there exists a limiting frequency which depends on the capacitance of the panel, the resistance of the supply circuit and the power input.

This data is illustrative of results which may be obtained utilizing the methods of the present invention but not to be considered limiting. Further decreases in the time to force disorient, may be obtained by the use of greater voltages, smaller viscosities and smaller dipoles. The voltage can be increased by a factor of 5, the viscosity can be decreased by a factor of 2, and the dipole length decreased by a factor of 3. The speed varies linearly with the voltage and viscosity, and as the cube of the dipole length, hence a speed increase of about $2\times5\times3^3 = 270\times$ is considered feasible. Thus, random closure speeds can be ultimately decreased $(5000/270) = 20$ microseconds, and the forced closure to about 0.2 [microsecond] *microseconds.*

Theory and experiment also has shown that forced disorientation occurs in a shorter time than forced orientation. This follows because the disorientation process proceeds from a condition of order to disorder; while the orientation process proceeds from a condition of disorder to order. This is because Brownian motion aids the disorientation process and opposes the orientation process.

Figure 17:
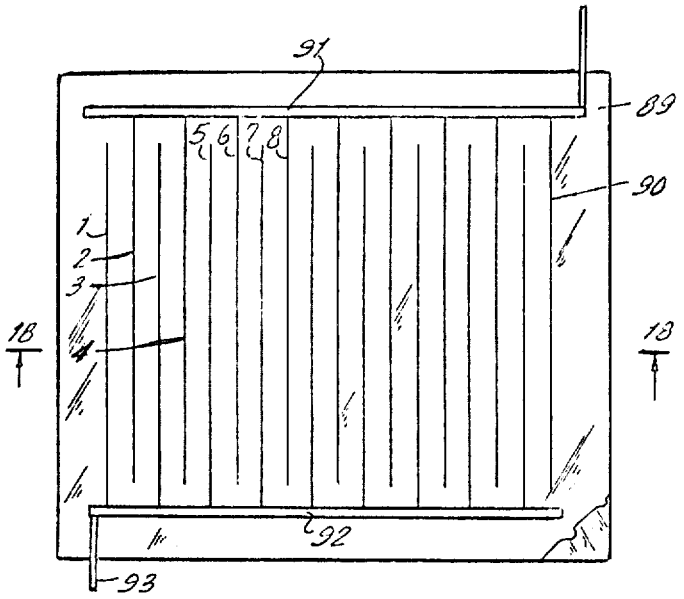
FIG. 17 shows a plan view of the simplified structure of a sheet having conducting line electrodes in which alternate lines are each connected to a common bus bar.
Figure 18:
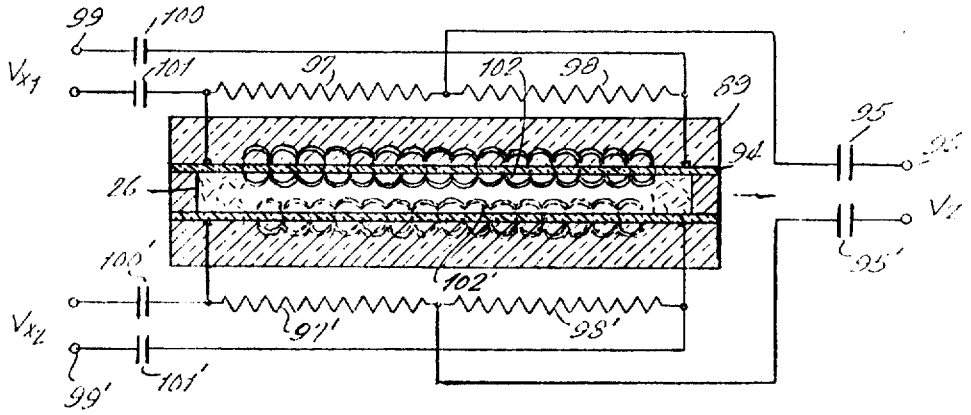
FIG. 18 is a sectional view taken on line 18—18 in FIG. 17 included in a forced closure VARAD cell assembly; and a capacitatively coupled circuit for ZX switching.

FIGS. 17 and 18 show a VARAD panel having line conductors and a circuit for applying thereto an interlaced time displaced electric field for inducing uniform forced closure.

FIG. 17 shows a plan view of a transparent supporting sheet 89 containing conducting lines 90 wherein each alternating conducting line is brought out to a single bus bar 91, and 92, there being two terminals per sheet.

FIG. 18 shows a cross section through an assembly of conducting line transparent supporting panels similar to that shown in FIG. 17, together with the capacitatively coupled circuit for actuating the alignment, and for providing forced disalignment when required. FIG. 18 also shows a novel interlaced field pattern which lends itself to the simplified circuitry shown.

Referring to FIG. 17, there is shown a support sheet 89 having conducting lines 1, 2, 3, 4, 5, 6, etc. deposited on the face thereof. Alternate lines 1, 3, 5, 7 are connected to busbar 92 at one end and thence to terminal 93. Over the conducting lines 1, 2, 3, 4, 5, 6, there is coated a transparent coating 94 preferably of thin glass of the order of a few microns thick.

FIG. 18 shows a cross section of FIG. 17 along the line 18, 18'. The alternating potential differences shown in FIG. 3 are utilized in connection with FIG. 18. The alternating potential difference $V_z$ is applied as long as the dipole suspension is to be oriented in the Z direction across the terminals 96. The terminals 96 are isolated from the circuit by condenser 95 and 95' which connect respectively to the center taps of resistor pairs 97–98 and 97′–98′. When the dipole suspension 26 is to be disaligned, the alternating potential difference $V_{x1}$ is applied across terminals 99; and immediately thereafter the gated alternating potential difference $V_{x2}$ is applied across the terminals 99′. The terminals 99 are connected through condenser pairs 100–101 across the resistor pairs 97–98. In similar manner, the terminals 99′ are connected to the condenser pairs 100′–101′, and thence across the resistor pairs 97′–98′. The effect of applying $V_{x1}$ is to establish the field pattern 102 which causes the disorientation of dipoles near one major surface of the dipole layer.

As previously described, the field lines change from the X direction and loop toward the Z direction as they approach the conducting lines, causing the panel to opaque non-uniformly, showing alternate opaque and light strips. This is avoided by the immediate application of $V_{x2}$ after the application of $V_{x1}$, which gives rise to time displaced interlaced field patterns 102 and 102′. Field 102′ has an X component where the field 102 has a Z component, and vice versa; the interlacing being such that a uniform opaquing now occurs across the entire face of the pattern. The field pattern shown in FIG. 18 should be compared with the field patterns of FIG. 2.

In FIG. 2, the field pattern is symmetrical and simultaneous with reference to the center plane of the dipole suspension layer. The field patterns of the upper and lower plates 89 and 89′ are established simultaneously and are the same about the upper and lower conducting lines.

FIG. 18 shows the time displaced interlaced electric field pattern suitable for forced closure.

In FIG. 18 the electric field structures from the upper plate 89 and from the lower plate 89′, are not symmetrical about the center plane of the dipole suspension. The effect of applying the gated alternating potential differences $V_{x1}$ shown in FIG. 3, is to establish the upper electric field pattern first, and the lower electric field pattern second. The interlacing of these electric field patterns assures the uniformity of the opaquing effect across the face of the panel. The plate structure in FIG. 17 is much simpler than the plate structure of FIG. 4. In FIG. 17, each supporting sheet 11 has only one pair of electrodes. In FIG. 4 there are four conductors on each plate, and a more complex method of preparation is required. Moreover, the circuit shown in FIG. 18 is simpler than the circuit shown in FIG. 13 which is required to actuate the conducting line structure of FIG. 4.

The conducting line structure of FIG. 18 does not have the critical isolation requirements of the conducting line structure of FIG. 2, in which it is preferable to isolate the intermediate line structures to prevent the local shorting out of the electric field on the alternate conducting lines.

Having thus fully described the invention what is claimed as new and sought to be secured by Letters Patent of the United States is:

What is claimed is:

1. A light controlling device comprising *a pair of* spaced transparent sheets, a transparent suspending medium between said sheets, a layer comprising a plurality of elongated *dipoles* [dipole members] freely carried within the suspending medium, each said dipole having a first dimension in *a* [the] direction of elongation on the order of one-half the wavelength of light and a second dimension normal to the direction of elongation substantially smaller than said first dimension [and], *said dipoles* presenting a cross-section to electromagnetic radiation which is a function of their orientation, whereby light transmission through the layer is at a maximum when the direction of elongation of said dipoles are oriented parallel to [the] *a* light path and at a minimum when said dipoles are in random directions, a first series of spaced wire-like electrodes straight line parallel to each other lying in a plane along one of the sheets and carried by one of the transparent sheets, a second series of spaced wire-like electrodes straight line parallel to each other lying in a plane parallel to the plane of the first series along the other transparent sheet, all of said electrodes being parallel to each other, electrical interconnecting means combining selected electrodes into a plurality of sets for each sheet and electrical circuit means to selectively apply electrical alternations to the sets whereby electric field patterns are created within the dipole suspension to control the disposition of the dipoles within the suspension.

2. The process of inducing a rapid randomization of dipoles within a dipole suspension layer comprising, applying a first alternating potential difference across the suspension *layer* in the Z direction normal to the plane of the layer, to orient the dipoles in the Z direction, terminating the said alternating potential *difference* and immediately upon said termination momentarily applying a second alternating potential difference to the dipole suspension layer in a direction *substantially* normal to said Z direction, whereby the dipoles are rapidly swung out of their Z orientation.

3. The process according to claim 2 in which the second alternating potential is applied in the plane of the dipole layer to electrodes disposed on each side of the dipole layer, whereby said dipoles are swung out of their Z orientation normal to the plane of the dipole layer and into an orientation parallel to the plane of the dipole layer.

4. The process of inducing a rapid randomization of dipoles within a dipole fluid suspension layer comprising applying a first alternating potential difference across the dipole suspension layer in the Z direction normal to the plane of the layer, terminating said first potential difference and immediately upon said termination momentarily applying a second alternating potential difference to the dipole suspension layer [,] parallel to the plane of the layer, whereby the rotational inertia of the dipoles causes them to swing into random directions.

5. A device according to claim 1 in which the second series of spaced wire-like electrodes are parallel to but offset from the first series of spaced wire-like electrodes a distance equal to one-half the spacing between *adjacent ones of* said electrodes, whereby the electric field pattern is shifted by one-half the said electrode spacing on each side of the said dipolar suspension layer.

6. A device according to claim 1 in which the electric alternations are first applied in the Z direction and then in the X direction to force randomize the dipoles.

7. A device according to claim 1 in which the means to apply the electrical alternations includes a plurality of circuits electrically isolated from each other by blocking filters whereby alternate conducting line pairs are electrically isolated.

8. A device according to claim 1 in which the electrical circuits for controlling the dipole suspension layer contained between the transparent sheets comprise first and second transformers each having a primary and two centertapped secondaries, and a third transformer having a primary and a secondary, first and second amplifiers for actuating said first and second transformers, with first phase and second phase alternating potential differences having 90° displaced phases, a third amplifier for actuating said third transformer; the centertap of one of the secondaries of the first transformer and the centertap of one of the secondaries of the second transformer connected to one of the outer terminals of the secondary of the third transformer and the centertaps of the other secondaries of the first and second transformers connected to the other outer terminal of the secondary of the third transformer, whereby an alternating voltage on the secondary of the third transformer orients the dipoles in the Z direction, by applying an alternating potential difference between each of the conducting lines, on one side of the dipole suspension and the corresponding lines on the other side, and subsequently said alternating voltage is removed from the secondary of the third transformer and said first phase is applied between every other conducting line and said second phase is applied to the remaining conducting lines of the first series while simultaneous application is made to the second series of conductors to provide a shifting interlaced electric field with components in the X direction to force disorient the said dipole suepension.

9. An isolation circuit for Z-X switching the dipoles in a dipole suspension cell according to claim 1, said circuit comprising a capacitor resistor coupling network whereby alternate interlaced pairs of conducting lines are electrically isolated from each other, and whereby the actuating pulses are applied capacitatively.

10. A device according to claim 1 in which the electrical alternations are applied to a selected set of spaced line electrodes on one sheet and a selected set of spaced line electrodes on the second sheet, said selected line electrodes on the second sheet being laterally displaced with respect to the selected line electrodes of the first sheet whereby rotating electrical field vectors are produced within the suspension which periodically shift back and forth in the plane of the suspension.

*11. A device according to claim 1 in which said electrical interconnecting means create interlaced time displaced electric field patterns within the dipole suspension layer.*

*12. A device according to claim 1 in which said electrical circuit means create interlaced space displaced electric field patterns within the dipole suspension layer.*

*13. A device according to claim 1 in which said electrode sets comprise first electrode sets comprising selected electrodes from said first series of spaced electrodes and second electrode sets comprising selected electrodes from said second series of spaced electrodes.*

*14. A device according to claim 1 in which said electrical interconnecting means create electric field patterns in alternating relationship by creating a first electric field pattern on one face of said dipole suspension layer by the application of a first alternating potential difference to said first series of electrodes, thereafter creating another electric field pattern on the other face of said dipole suspension layer by the application of a second alternating potential difference to said second series of electrodes, and said second alternating potential difference being applied after the cessation of said first alternating potential difference.*

*15. A device according to claim 14 in which said electric field pattern on said one face of the dipole suspension layer is interlaced, and said electric field pattern on said other one of said faces of the dipole suspension layer is interlaced.*

*16. A device according to claim 7 in which said conducting line pairs are disposed in alternate non-adjacent relationship with respect to one another.*

*17. A device according to claim 1 in which at least one of said first and second series of electrodes are disposed within said corresponding one of said pair of transparent sheets.*

References Cited

The following references, cited by the Examiner, are of record in the patented file of this patent or the original patent.

UNITED STATES PATENTS

| | | | |
|---|---|---|---|
| 3,527,525 | 9/1970 | Marks | 350—267 |
| 3,594,065 | 7/1971 | Marks | 350—267 X |
| 2,543,793 | 3/1951 | Marks | 178—6.5 |

OTHER REFERENCES

"Parallel," p. 1637, Webster's Third New International Dictionary.

DAVID SCHONBERG, Primary Examiner

P. K. GODWIN, Assistant Examiner

U.S. Cl. X.R.

350—160 R